(12) United States Patent
Jain et al.

(10) Patent No.: US 11,429,976 B1
(45) Date of Patent: Aug. 30, 2022

(54) CUSTOMER AS BANKER SYSTEM FOR EASE OF BANKING

(71) Applicant: Wells Fargo Bank, N.A., San Francisco, CA (US)

(72) Inventors: Rahul N. Jain, Hyderabad (IN); Rajkumar Vuddemari, Hyderabad (IN); Srikanth Kandoti, Hyderabad (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 16/263,912

(22) Filed: Jan. 31, 2019

(51) Int. Cl.
G06Q 20/40 (2012.01)
G06Q 20/06 (2012.01)
H04L 9/40 (2022.01)

(52) U.S. Cl.
CPC ........... *G06Q 20/405* (2013.01); *G06Q 20/06* (2013.01); *H04L 63/0838* (2013.01); *H04L 63/0861* (2013.01)

(58) Field of Classification Search
CPC .. G06Q 20/405; G06Q 20/06; H04L 63/0838; H04L 63/0861
See application file for complete search history.

(56) References Cited

U.S. PATENT DOCUMENTS 8,280,786 B1\* 10/2012 Weiss .................... G06Q 40/02 705/30
10,182,048 B1\* 1/2019 Sabanayagam ......... G06F 21/45
2009/0172402 A1\* 7/2009 Tran ...................... H04L 9/3231 713/170
2011/0106690 A1 5/2011 Fisher (Continued)

FOREIGN PATENT DOCUMENTS

CN 106875270 6/2017
WO 2018009973 1/2018

OTHER PUBLICATIONS

Tentative settlement reached to help visually impaired with access to ATMs; PNC to test unique use of cellphones for 'Person-to-person' ATM access. (Jan. 4, 2001). PR Newswire Retrieved from https://dialog.proquest.com/professional/docview/449248811?accountid=131444 on Apr. 13, 2022 (Year: 2001).\*

(Continued)

*Primary Examiner* — Kito R Robinson
(74) *Attorney, Agent, or Firm* — Womble Bond Dickinson (US) LLP

(57) ABSTRACT

A secure transaction system, computer program recording medium and method facilitate secure, in-person peer-to-peer transaction. A controller of the secure transaction system authenticates first and second parties of a transaction via respective first and second user devices. A financial trustworthiness of at least the second party is determined. The controller vouches for the financial trustworthiness of the second party to the first party via the first user device. The controller brokers an in-person transaction that comprises transfer of physical value from the first party to the second party. In response to receiving confirmation of the transfer to the physical value between the first and second parties, the controller adjusts first and second financial accounts respectively associated with the first and second parties to reflect the transfer.

17 Claims, 8 Drawing Sheets

(56) References Cited

U.S. PATENT DOCUMENTS

| | | | |
|---|---|---|---|
| 2012/0240195 A1* | 9/2012 | Weiss | H04L 63/0846 |
| | | | 726/4 |
| 2014/0098360 A1* | 4/2014 | Kwon | G07D 7/10 |
| | | | 356/51 |
| 2014/0279380 A1 | 9/2014 | Melnichenko et al. | |
| 2015/0310470 A1* | 10/2015 | Mathew | G06Q 30/0215 |
| | | | 705/14.17 |
| 2015/0339638 A1* | 11/2015 | DeLuca | G06Q 20/327 |
| | | | 705/39 |
| 2016/0155193 A1 | 6/2016 | Merrill et al. | |
| 2017/0011373 A1* | 1/2017 | Todasco | G06Q 20/10 |
| 2017/0061535 A1 | 3/2017 | Williams | |
| 2017/0169508 A1 | 6/2017 | Song et al. | |
| 2018/0040064 A1 | 2/2018 | Grigg et al. | |
| 2018/0075527 A1 | 3/2018 | Nagla et al. | |
| 2018/0089668 A1* | 3/2018 | Wong | G06Q 20/381 |
| 2018/0096351 A1* | 4/2018 | Dahn | G06Q 20/38 |
| 2018/0240187 A1 | 8/2018 | Lee et al. | |
| 2019/0005473 A1* | 1/2019 | de Villiers | G06Q 40/02 |

OTHER PUBLICATIONS

Al-Sakran, et al. "These 3 Indian startups are making the most of artificial intelligence!" India Today, Sep. 3, 2018, accessed from https://in.finance.yahoo.com/news/3-indian-startups-making-most-082623657.html.

Al-Sakran, et al. "Mobile e-Loan Negotiation Architecture" Journal of Internet Banking and Commerce, Ottawa, vol. 17, Issue 2, Aug. 2012.

* cited by examiner

CUSTOMER AS BANKER SYSTEM FOR EASE OF BANKING

BACKGROUND

The present application relates to systems and methods for facilitating secure transactions conducted via a user device, and more particular to systems and methods for facilitating secure peer-to-peer transactions via two user devices.

Often people have a challenge to get cash bills at locations that lack a bank store or Automated Teller Machine (ATM). It becomes difficult to get cash bills in remote areas as there could be no bank store or ATM in the area. Due to individual mobility constraints, a person needing cash may find it inconvenient to leave a venue for an ATM even if an ATM is available.

Before automation, a person needing cash would find another person with resources to loan the cash. Finding such a person is challenging. The borrower would have to be personally known to the other person. In addition, the borrower further needs to be known as financially responsible. A borrower is often in a location where such a person with resources is not available.

BRIEF DESCRIPTION

This brief description is provided to introduce a selection of concepts in a simplified form that are described below in the detailed description. This brief description is not intended to be an extensive overview of the claimed subject matter, identify key factors or essential features of the claimed subject matter, nor is it intended to be used to limit the scope of the claimed subject matter.

In one or more embodiments, the present disclosure provides a method for facilitating secure, in-person peer-to-peer transaction. In one or more embodiments, the method includes authenticating, by a controller of a secure transaction system, first and second parties of a transaction via respective first and second user devices. The method includes determining a financial trustworthiness of at least the second party. The method includes vouching for the financial trustworthiness of the second party to the first party via the first user device. The method includes brokering an in-person transaction that comprises transfer of physical value from the first party to the second party. In response to receiving confirmation of the transfer to the physical value between the first and second parties, the method includes adjusting first and second financial accounts respectively associated with the first and second parties to reflect the transfer.

In one or more embodiments, the present disclosure provides a secure transaction system that facilitates secure in-person peer-to-peer transaction. In one or more embodiments, the secure authentication system includes a communication module, a memory containing financial accounts for customers, an authentication system, and a controller. The controller is communicatively coupled to the communication module, the memory, and the authentication system, the controller enables the secure transaction system to authenticate first and second parties of a transaction via respective first and second user devices. The controller enables the secure transaction system to determine a financial trustworthiness of at least the second party. The controller enables the secure transaction system to vouch for the financial trustworthiness of the second party to the first party via the first user device. The controller enables the secure transaction system to broker an in-person transaction that comprises transfer of physical value from the first party to the second party. In response to receiving confirmation of the transfer to the physical value between the first and second parties, the controller enables the secure transaction system to adjust first and second financial accounts respectively associated with the first and second parties to reflect the transfer.

In one or more embodiments, the present disclosure provides a computer-readable storage medium comprising computer-executable instructions, which when executed via a processing unit on a computer performs acts. The acts include authenticating, by a controller of a secure transaction system, first and second parties of a transaction via respective first and second user devices. The acts include determining a financial trustworthiness of at least the second party. The acts include vouching for the financial trustworthiness of the second party to the first party via the first user device. The acts include brokering an in-person transaction that comprises transfer of physical value from the first party to the second party. In response to receiving confirmation of the transfer to the physical value between the first and second parties, the acts include adjusting first and second financial accounts respectively associated with the first and second parties to reflect the transfer.

The following description and annexed drawings set forth certain illustrative aspects and implementations. These are indicative of but a few of the various ways in which one or more aspects may be employed. Other aspects, advantages, or novel features of the disclosure will become apparent from the following detailed description when considered in conjunction with the annexed drawings.

BRIEF DESCRIPTION OF THE DRAWINGS

Aspects of the disclosure are understood from the following detailed description when read with the accompanying drawings. Elements, structures, etc. of the drawings may not necessarily be drawn to scale. Accordingly, the dimensions of the same may be arbitrarily increased or reduced for clarity of discussion, for example.

DETAILED DESCRIPTION

Figure 1:
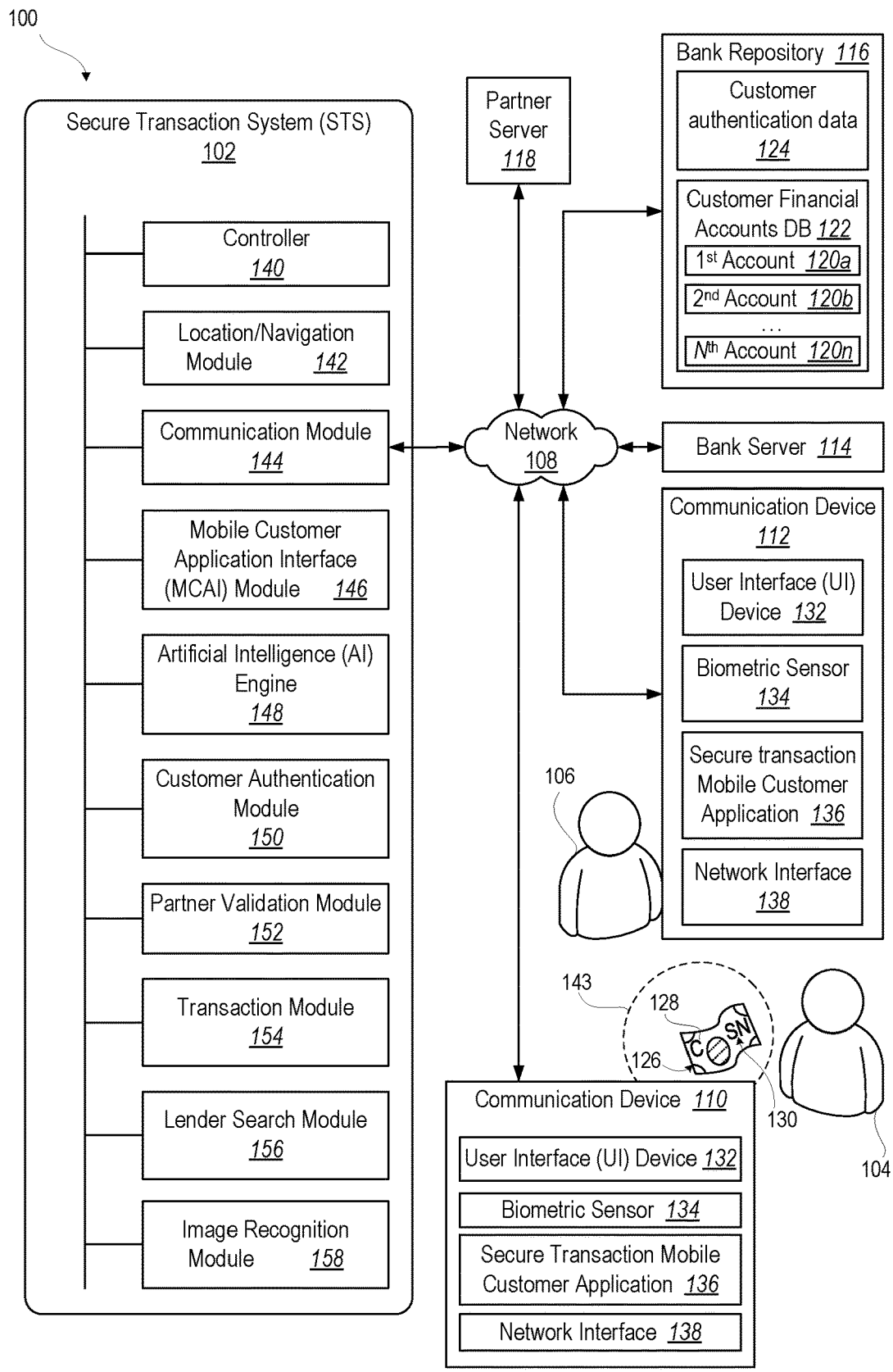
FIG. 1 is a simplified functional block diagram illustrating a secure transaction system (STS) environment having an STS that facilitates a secure transaction being parties that involves transfer of physical value, according to one or more embodiments.

In one or more aspects, the present innovation relates to a mobile customer banking platform to enable lending or borrowing of cash bills to/from another customer in the same location. In one embodiment, the platform comprises a user interface (UI) used by a borrower or a lender. Using the UI, a borrower could login into the platform and make a request for cash bills of desired amount. The UI generates a search request comprising the borrower credentials and current location to locate one or more lenders located nearby the borrower's current location. The platform also has a lenders search module that determines a list of lenders and displays the list to the borrower.

Using the UI, the lenders may also login into the platform, join the network, and also feed inputs like available cash amount, time to collect the cash, etc. The lenders inputs enable being identified during a search for an appropriate lender. The lender inputs can be displayed as lender during the search by a borrower on a particular day and time. The UI enables the borrower to select at least one lender from the list of lenders based on the availability of the lenders. Alternatively, AI engine of the platform may select at least one lender based on matching criteria. The AI validates the lender's availability/location and selects the at least one lender based on validation. Upon receiving confirmation from the borrower, the transaction is initiated by the platform. A transaction module of the platform verifies the authenticity of the borrower and lender, using profiles stored in the bank repository or cross-checking with the bank. On successful verification, the transaction module sends a one-time password (OTP) or any other secure mechanisms to initiate the transaction and record the transaction with bank server. Customers of partner banks can also get registered in this platform to borrow and lend money after being verified by a partner validation module. Thus, the disclosed innovation enables customers to get cash bills immediately without visiting a bank store or automatic teller machine (ATM) centers.

Embodiments or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

The following terms are used throughout the disclosure, the definitions of which are provided herein to assist in understanding one or more aspects of the disclosure.

As used herein, the term "infer" or "inference" generally refer to the process of reasoning about or inferring states of a system, a component, an environment, a user from one or more observations captured via events or data, etc. Inference may be employed to identify a context or an action or may be employed to generate a probability distribution over states, for example. An inference may be probabilistic. For example, computation of a probability distribution over states of interest based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several event and data sources.

Turning to the Drawings, FIG. 1 is a simplified functional block diagram illustrating a secure transaction system (STS) environment 100 having STS 102 that enables secure transactions involving transfer of physical value between first and second parties 104, 106. To facilitate the secure transaction, STS 102 is communicatively coupled via network 108 with first and second user device 110, 112 respectively associated with first and second parties 104, 106. STS 102 is also communicatively coupled via network 108 to bank server 114, bank repository 116, and partner server 118 that provide support to secure transaction, such as accounting and authenticating. The secure transaction is for a transfer of physical value from first and second parties 104, 106 that is reflected in an adjustment in respective customer accounts 120a-b of accounts 120 a-n in customer financial accounts database(s) 122 and customer authentication data 124 that are maintained on one or both of bank repository 116 and partner server 118. Physical value can be any goods or service. In one or more embodiments, physical value is currency bills 126 having currency denomination information 128 and serial number information 130. First and second user devices 110, 112 each include user interface (UI) device 132 for presenting a UI, biometric sensor 134 for physically identifying a respective first and second party 104, 106, and secure transaction mobile customer (STMC) application 136 that interacts with STS 102 via network interface 138.

In one or more embodiments, STS 102 includes controller 140 that performs executive and management functions for orchestrating the overall process of secure transactions between two parties 104, 106. STS 102 includes location/navigation module 142 that determines geographic and relative positions of first and second user device 110, 112. Location/navigation module 142 can provide navigation guidance to parties 104, 106 to a transaction location 143. STS 102 includes communication module 124 that provides communicatively coupling to network 108. STS 102 includes mobile customer application interface (MCAI) module 146 that interacts with STMC applications 136 of respective user device 110, 112. STS 102 includes artificial intelligence (AI) engine 148 that can assist in optimizing selection of available parties for the secure transaction, such as first party 104 as lender. STS 102 includes customer authentication module 150 that validates information from biometric sensor 134 and UI device 132 from respective user device 110, 112 against customer authentication data 124. STS 102 includes partner validation module 152 that provides information necessary to communicatively couple to partner server 118. STS 102 includes transaction module 154 that incorporates the business rules and methodology necessary to execute a legally sufficient secure transaction. STS 102 includes lender search module 156 that can perform criterion based searches for find a subset of available lenders. STS 102 includes image recognition module 158 that correlates received images from user device 110, 112 against customer authentication data 124 for user images and against other information regarding official currency standards. Image recognition module 158 can also perform optical character recognition to determine a currency denomination and a serial number of currency.

Figure 2:
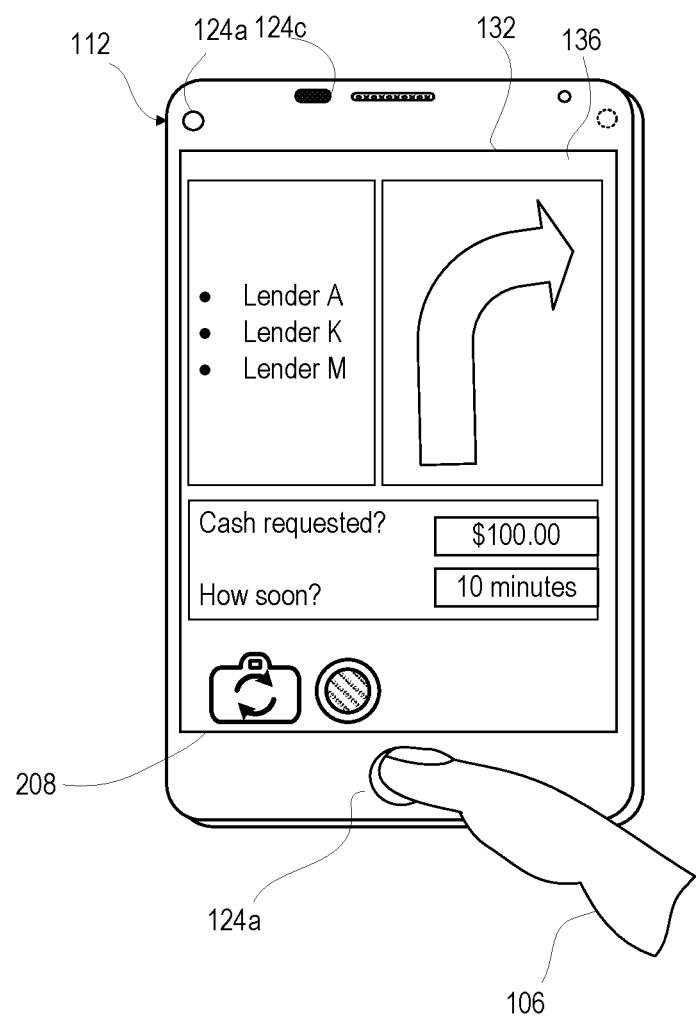
FIG. 2 illustrates a front view of a mobile communication device that is performing a secure transaction for second party, according to one or more embodiments.

FIG. 2 illustrates a front view of user device 112 that is performing secure transaction for second party 106. User device 106 includes user interface device 132 that is a graphical touchscreen presenting STMC application 136. STMC application 136 presents information and user controls such as including a navigation aid, transaction interface, and a lender selection list. Party 106 is authenticating with first biosensor 124a that detects a fingerprint. Second biosensor 124b is provided camera that perform face recognition or gesture recognition. Third biosensor 124c is provide by microphone that can receive a voice input that is either tonally recognized or interpreted as an authentication code.

Figure 3:
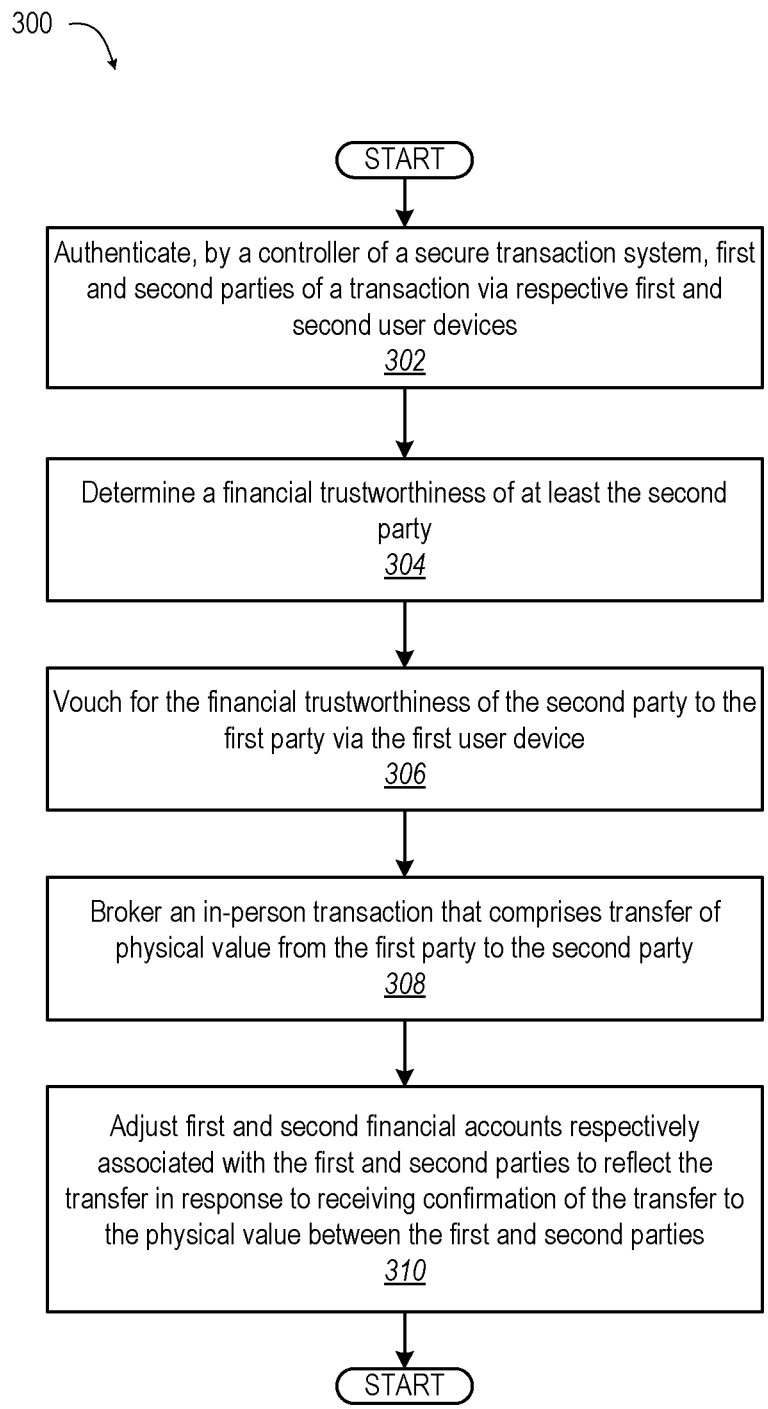
FIG. 3 is a flow diagram illustrating a method for facilitating secure, in-person peer-to-peer transaction, according to one or more embodiments.

FIG. 3 is a flow diagram illustrating method 300 for facilitating secure, in-person peer-to-peer transaction. In one or more embodiments, method 300 includes authenticating, by a controller of a secure transaction system, first and second parties of a transaction via respective first and second user devices (block 302). Method 300 includes determining a financial trustworthiness of at least the second party (block 304). Method 300 includes vouching for the financial trustworthiness of the second party to the first party via the first user device (block 306). Method 300 includes brokering an in-person transaction that comprises transfer of physical value from the first party to the second party (block 308). In response to receiving confirmation of the transfer to the physical value between the first and second parties, method 300 includes adjusting first and second financial accounts respectively associated with the first and second parties to reflect the transfer.

Figure 4A:
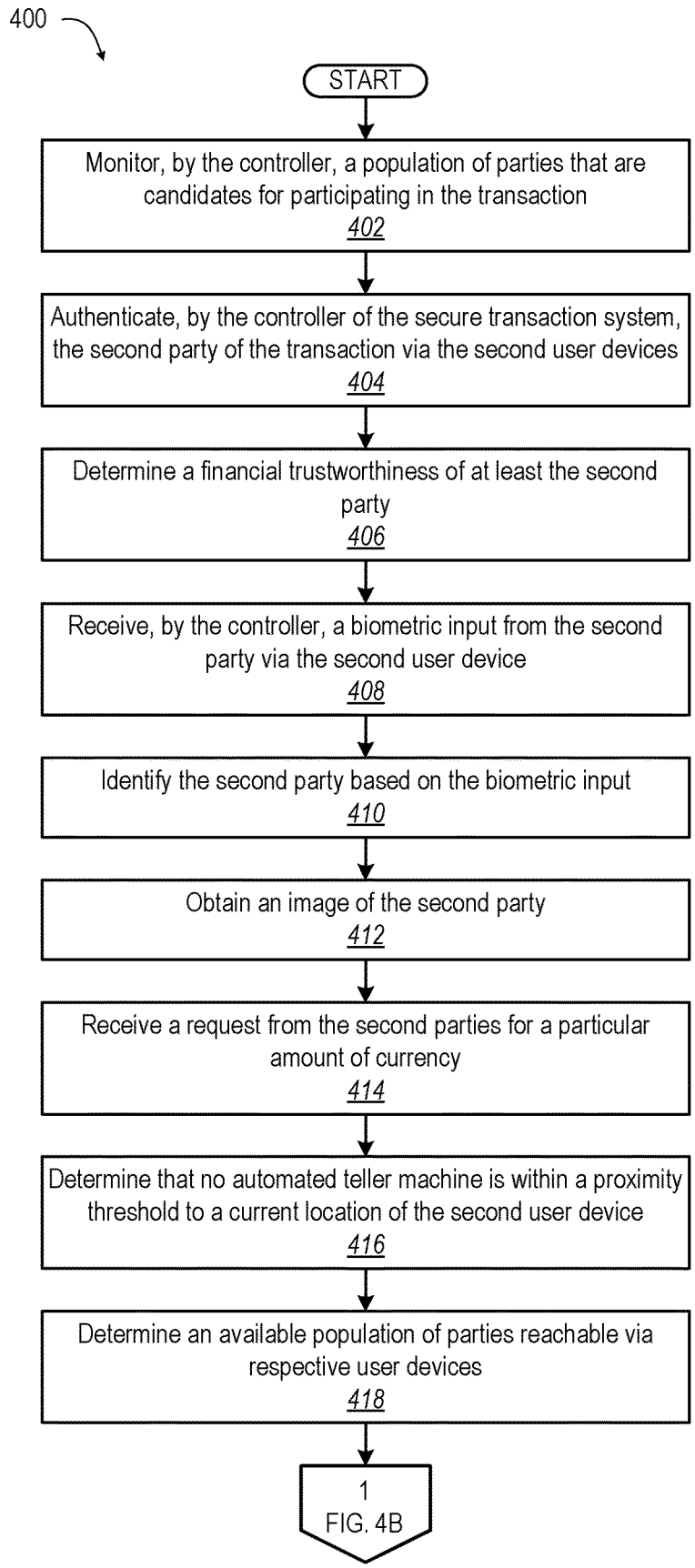
FIGS. 4A-C are a flow diagram illustrating a method for facilitating secure, in-person peer-to-peer transaction, according to one or more embodiments.
Figure 4B:
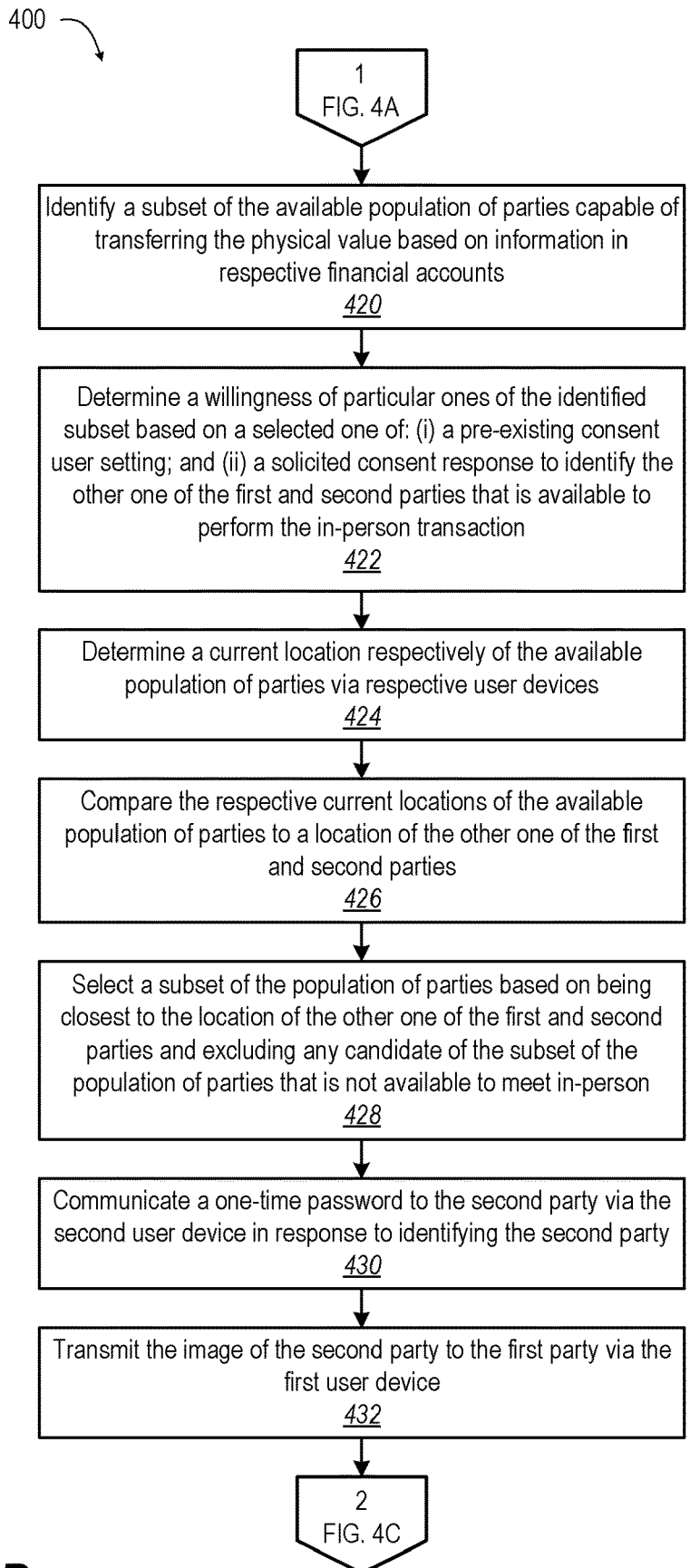

FIGS. 4A-B are a flow diagram illustrating method 400 for facilitating secure, in-person peer-to-peer transaction. In one or more embodiments, method 400 includes monitoring, by the controller, a population of parties that are candidates for participating in the transaction (block 402). Method 400 includes authenticating, by the controller of the secure transaction system, the second party of the transaction via the second user devices (block 404). Method 400 includes determining a financial trustworthiness of at least the second party (block 406). Method 400 includes receiving, by the controller, a biometric input from the second party via the second user device (block 408). Method 400 includes identifying the second party based on the biometric input (block 410). Method 400 includes obtaining an image of the second party (block 412).

Method 400 includes receiving a request from the second parties for a particular amount of currency (block 414). Method 400 includes determining that no automated teller machine is within a proximity threshold to a current location of the second user device (block 416). Method 400 includes determining an available population of parties reachable via respective user devices (block 418). Method 400 includes identifying a subset of the available population of parties capable of transferring the physical value based on information in respective financial accounts (block 420).

To identify the other one of the first and second parties that is available to perform the in-person transaction, method 400 includes determining a willingness of particular ones of the identified subset based on a selected one of: (i) a pre-existing consent user setting; and (ii) a solicited consent response (block 422). Method 400 includes determining a current location respectively of the available population of parties via respective user devices (block 424). Method 400 includes comparing the respective current locations of the available population of parties to a location of the other one of the first and second parties (block 426). Method 400 includes selecting a subset of the population of parties based on being closest to the location of the other one of the first and second parties and excluding any candidate of the subset of the population of parties that is not available to meet in-person (block 428). Method 400 includes communicating a one-time password to the second party via the second user device in response to identifying the second party (block 430). Method 400 includes transmitting the image of the second party to the first party via the first user device (block 432). Method 400 includes brokering the in-person transaction that comprises transfer of physical value from the first party to the second party comprises by selecting a transaction location from one of: (i) current location of the first party; (ii) current location of the second party; and (iii) closest one of a plurality of preselected sites to the first and second parties (block 434). Method 400 includes directing at least one of the first and second parties to the transaction location via the respective first and second user devices (block 436). Method 400 includes receiving the one-time password via the first user device (block 438). Method 400 includes vouching for the financial trustworthiness of the second party to the first party via the first user device (block 440). Method 400 includes receiving a digital image from the first user device (block 442). Method 400 includes recognizing a currency denomination and a currency bill serial number of currency in the image (block 444). Method 400 includes receiving an indication from the second user via the second user device of acceptance of the currency as the physical value (block 446). In response to receiving confirmation of the transfer to the physical value between the first and second parties, method 400 includes adjusting first and second financial accounts respectively associated with the first and second parties to reflect the transfer including a fee (block 448). Then method 400 ends.

Figure 5:
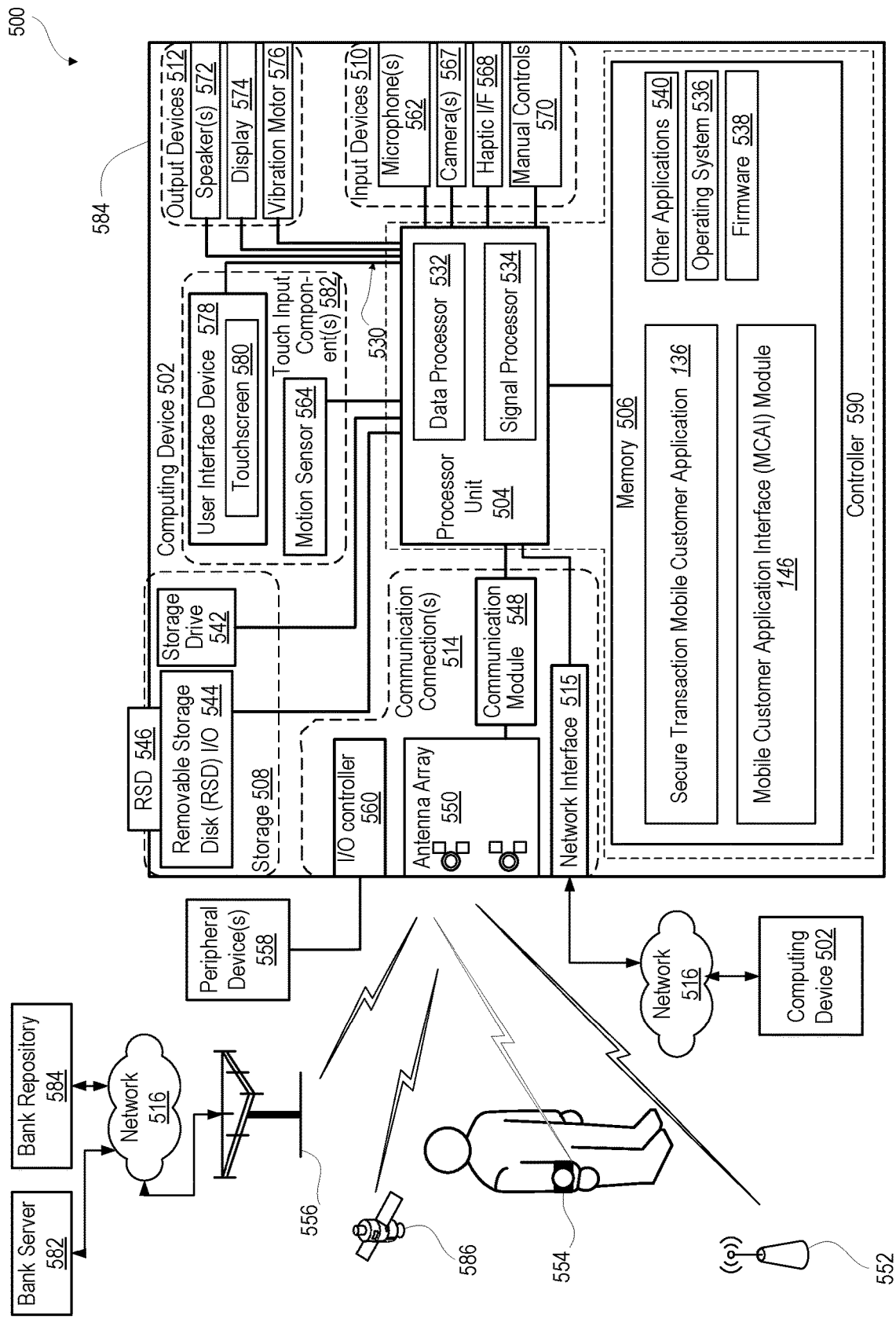
FIG. 5 illustrates a block diagram of a system having a computing device that performs aspects of the present disclosure, according to one or more embodiments.

FIG. 5 illustrates a system 500 including a computing device 502 configured to implement one or more embodiments provided herein. Computing device 502 can perform functionality to support one or more roles such as either user device 110, 112 or STS 102 (FIG. 1). For example, certain functions can be centralized or distributed across mobile devices. Computing device 502 can also represent user device 110 that is fixed in a location such as a vendor store of first party 104. Computing device 502 can also represent a network server that performs functions of STS 102 (FIG. 1). In one configuration, computing device 502 includes at least one processing unit 504 and memory 506. Depending on the exact configuration and type of computing device 502, memory 506 may be volatile, such as random access memory (RAM), non-volatile, such as random operating memory (ROM), flash memory, etc., or a combination of the two. In other embodiments, computing device 502 includes additional features or functionality. For example, device 502 may include additional storage such as removable storage or non-removable storage, including, but not limited to, magnetic storage, optical storage, etc. Such additional storage is illustrated in FIG. 5 by storage 508. In one or more embodiments, computer readable instructions to implement one or more embodiments provided herein are in storage 508. Storage 508 may store other computer readable instructions to implement an operating system, an application program, etc. Computer readable instructions may be loaded in memory 506 for execution by processing unit 504, for example.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

The term "computer readable media" as used herein includes computer storage media. Computer storage media includes volatile and nonvolatile, removable and non-removable media implemented in any method or technology for storage of information such as computer readable instructions or other data. Memory 506 and storage 508 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by computing device 502. Any such computer storage media is part of computing device 502.

Computing device 502 includes input device(s) 510 such as keyboard, mouse, pen, voice input device, touch input device, infrared cameras, video input devices, or any other input device. Output device(s) 512 such as one or more displays, speakers, printers, or any other output device may be included with computing device 502. Input device(s) 510 and output device(s) 512 may be connected to computing device 502 via a wired connection, wireless connection, or any combination thereof. In one or more embodiments, an input device 510 or an output device 512 from another computing device may be used as input device(s) 510 or output device(s) 512 for computing device 502. Computing device 502 may include communication connection(s) 514 that includes network interface 515 to facilitate communications via a network 516 with one or more other computing devices 502. Certain functionalities can be performed by software applications resident in memory 506, such as Secure Transaction Mobile Customer (STMC) Application 136 or Mobile Customer Application Interface (MCAI) Module 146

Referring now to an example specific component makeup and the associated functionality of the presented components, computing device 502 can incorporate a wide range of functionality increasingly typical of mobile devices. Processor unit 504 can be an integrated circuit (IC) that connects, via a plurality of bus interconnects 530, to a plurality of functional components of computing device 502. Processor unit 504 can include one or more programmable microprocessors, such as data processor 532 and digital signal processor (DSP) 534 of processor unit 504, which may both be integrated into a single processing device, in some embodiments. Processor unit 504 controls the communication, user interface, and other functions and/or operations of computing device 502. These functions and/or operations thus include, but are not limited to including, application data processing and signal processing. Computing device 502 may use hardware component equivalents such as special purpose hardware, dedicated processors, general purpose computers, microprocessor-based computers, micro-controllers, optical computers, analog computers, dedicated processors and/or dedicated hard wired logic. Connected to processor unit 504 is memory 506, which can include volatile memory and/or non-volatile memory. Memory 506 stores software, such as operating system 536, as well as firmware 538. One or more other executable applications 540 can be stored within memory 506 for execution by processor unit 504. Memory 506 may be augmented by on-device data storage, such as storage drive 542. Also connected to processor unit 504 is removable storage device (RSD) input/output (I/O) interface 544 that receives a RSD 546 for additional storage.

According to the illustrative embodiment, computing device 502 supports wireless communication via a communication module 548. Communication module 548 directs and power modulates a transmission beam at selected frequencies over an antenna array 550. For example, computing device 502 may support communication protocols and transceiver radio frequencies appropriate for a wireless local area network (WLAN), illustrated as node 552. Computing device 502 can communicate over a personal access network (PAN) with devices such as a smart watch 554. Computing device 502 can communicate with a radio access network (RAN) 556 that is part of a wireless wide area network (WWAN). In certain embodiments, computing device 502 may also support a hardwired local access network (LAN) (not shown) or peripheral devices 558 via an I/O controller 560.

Input devices 510 includes microphone(s) 562 that receive user audible inputs. Motion sensor 564 can detect contextual motion of computing device 502 as well as intentional user inputs according to aspects of the present disclosure. Image capturing device, such as a camera 567, can receive gestures and other image data. Haptic control 568 can provide an interface such as for braille reading or manual inputs. Other manual or keys 570 can have dedicated or programmed capabilities.

Output devices 512 includes audio speaker(s) 572 that can augment or provide alternate presentation of the visual or tactile outputs or provide playback. Display 574 presents graphical or alphanumeric information in a visual form. Vibration motor 576 provides alerts and more detailed information according to aspects of the present disclosure. Computing device 502 can utilize touchscreen 580 and/or motion sensor 564 as a touch input component 582 for aspects of the present disclosure.

User interface device 578 such as, or including, a touch screen 580, represents a component acting as both an input device 510 and an output device 512. Computing device 502 can be wholly or substantially encompassed by an enclosure 584. In one or more embodiments, computing device 502 can be a distributed system of wireless or wired links or a component subsystem incorporated into a larger assembly or system. In one or more embodiments, controller 590 for secure transaction of physical value transfer is provided by processor unit 506 executing computing instructions such as STMC application 136 or MCAI module 146. For example, MCAI module 146 can interact with bank server 582, bank repository 584 via network 516. For example, STMC application 136 can use location information obtained from global positioning system (GPS) satellites 586 to report geographic location to another computing device 502.

Figure 4C:
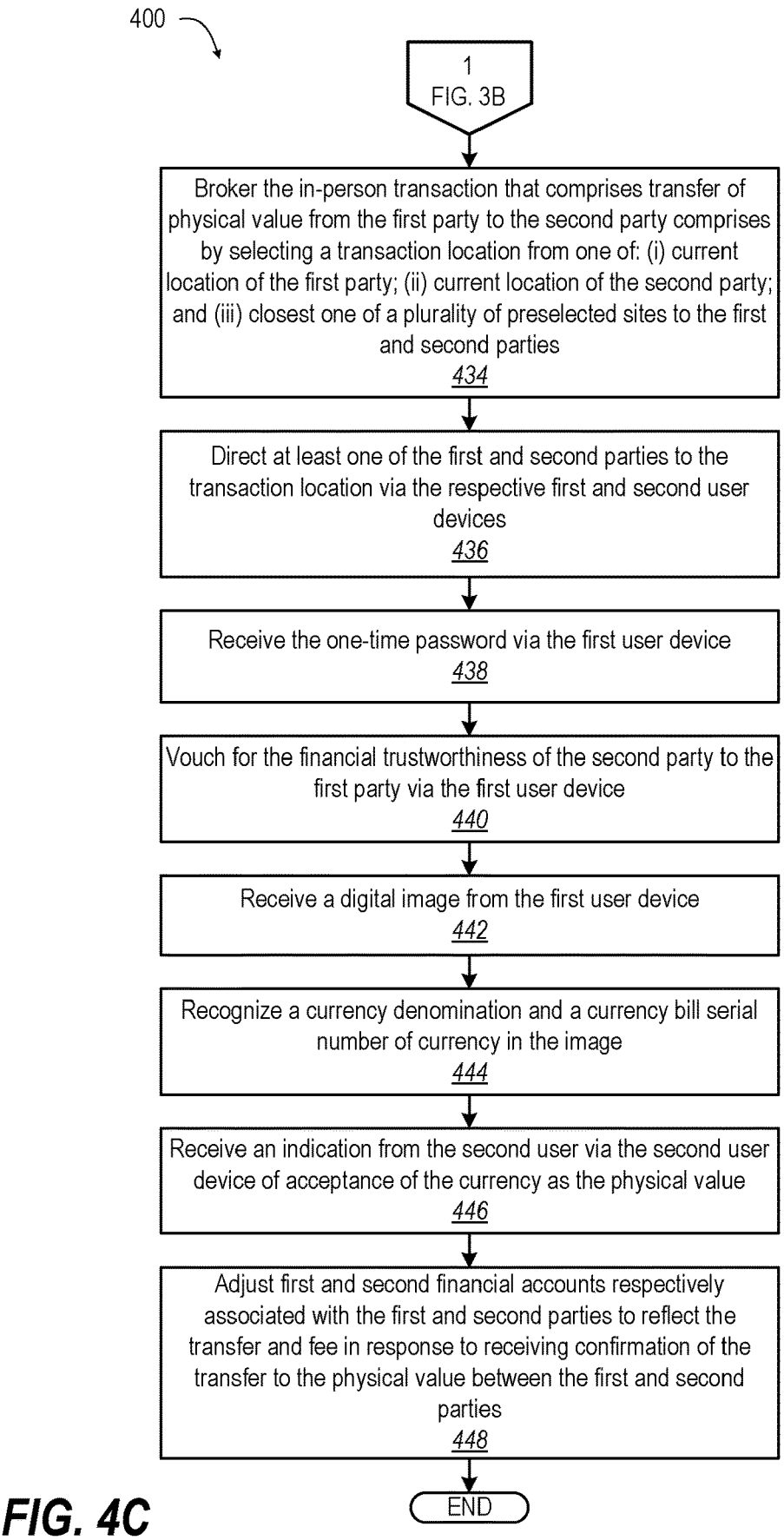
Figure 6:
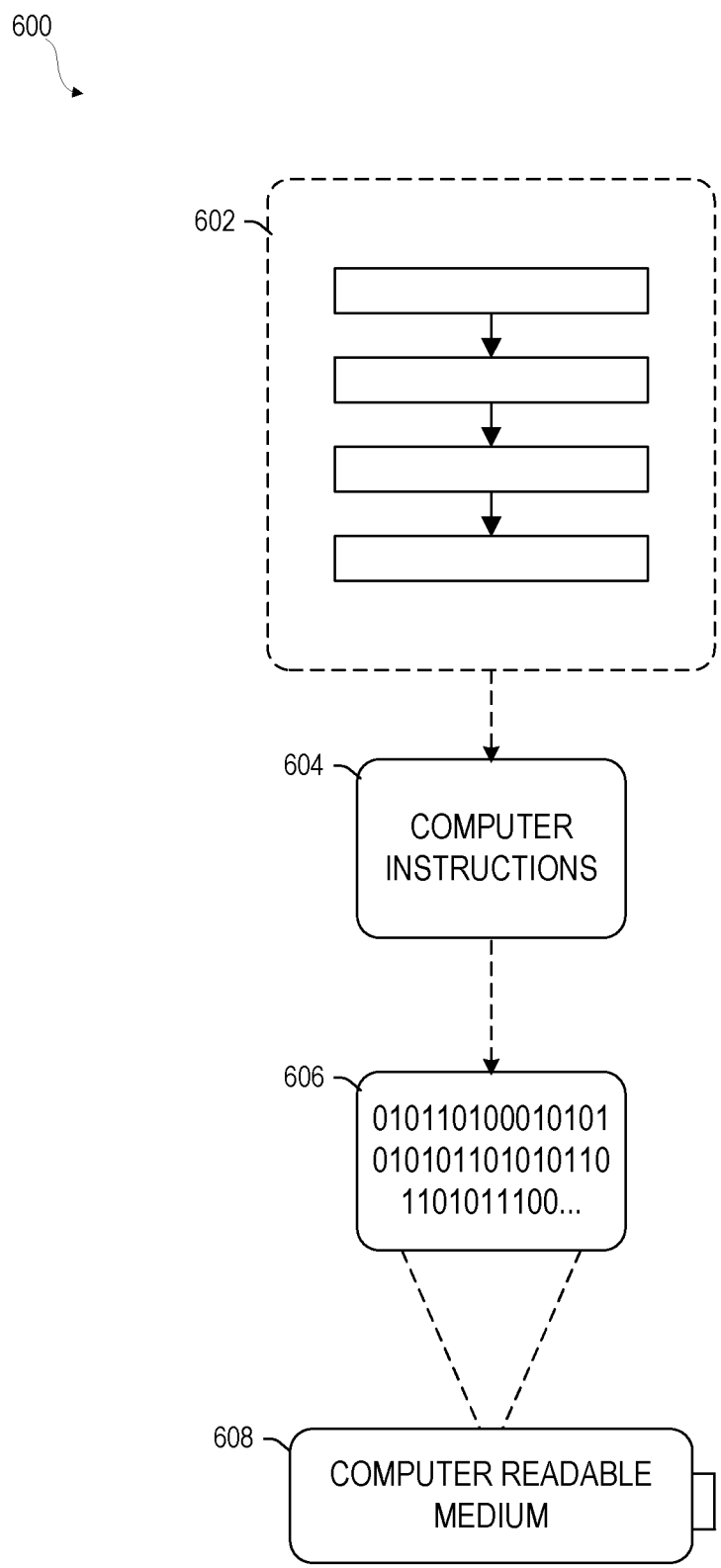
FIG. 6 illustrates a block diagram of example computer-readable medium or computer-readable device including processor-executable instructions configured to embody one or more of the provisions set forth herein, according to one or more embodiments.

Still another embodiment involves a computer-readable medium including processor-executable instructions configured to implement one or more embodiments of the techniques presented herein. An embodiment of a computer-readable medium or a computer-readable device devised in these ways is illustrated in FIG. 6, wherein an implementation 600 includes a computer-readable medium 608, such as a CD-R, DVD-R, flash drive, a platter of a hard disk drive, etc., on which is encoded computer-readable data 606. This computer-readable data 606, such as binary data including a plurality of zero's and one's as shown in 606, in turn includes a set of computer instructions 604 configured to operate according to one or more of the principles set forth herein. In one such embodiment 600, the processor-executable computer instructions 604 may be configured to perform a method, such as method 300 of FIG. 3, method 400 of FIGS. 4A-C, or method 500 of FIG. 5. In another embodiment, the processor-executable instructions 604 may be configured to implement a system, such as the STS 102 or user devices 110, 112 of FIG. 1 or computing device 602 of FIG. 6. Many such computer-readable media may be devised by those of ordinary skill in the art that are configured to operate in accordance with the techniques presented herein.

One or more embodiments may employ various artificial intelligence (AI) based schemes for carrying out various aspects thereof. One or more aspects may be facilitated via an automatic classifier system or process. A classifier is a function that maps an input attribute vector, x=(x1, x2, x3, x4, xn), to a confidence that the input belongs to a class. In other words, f(x)=confidence (class). Such classification may employ a probabilistic or statistical-based analysis (e.g., factoring into the analysis utilities and costs) to prognose or infer an action that a user desires to be automatically performed.

A support vector machine (SVM) is an example of a classifier that may be employed. The SVM operates by finding a hypersurface in the space of possible inputs, which the hypersurface attempts to split the triggering criteria from the non-triggering events. Intuitively, this makes the classification correct for testing data that may be similar, but not necessarily identical to training data. Other directed and undirected model classification approaches (e.g., naïve Bayes, Bayesian networks, decision trees, neural networks, fuzzy logic models, and probabilistic classification models) providing different patterns of independence may be employed. Classification as used herein, may be inclusive of statistical regression utilized to develop models of priority.

One or more embodiments may employ classifiers that are explicitly trained (e.g., via a generic training data) as well as classifiers which are implicitly trained (e.g., via observing user behavior, receiving extrinsic information). For example, SVMs may be configured via a learning or training phase within a classifier constructor and feature selection module. Thus, a classifier may be used to automatically learn and perform a number of functions, including but not limited to determining according to a predetermined criteria.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A method for facilitating secure, in-person peer-to-peer transaction, the method comprising:

monitoring, by a controller, a population of parties that are candidates for participating in a transaction;

receiving, by the controller, a request from a first party to identify a second party that is available to perform the transaction;

identifying an available one of the population of parties to be the second party;

optimizing selection of the second party for the transaction based on identification and matching criteria, wherein the optimizing uses artificial intelligence to select the second party;

authenticating, by the controller of a secure transaction system over a network, the first party via a first user device and the second party via a second user device;

determining a financial trustworthiness of at least the second party;

vouching for the financial trustworthiness of the second party to the first party via the first user device, wherein vouching for the financial trustworthiness of the second party to the first party via the first user device comprises:

communicating a one-time password from a mobile banking platform to the second party via the second user device in response to identifying the second party;

receiving, by the mobile banking platform, the one-time password via the first user device;

confirming, by the mobile banking platform, the one-time password to the first party via the first user device;

obtaining an image of the second party via the second user device; and transmitting the image of the second party over a network to the first user device;

brokering, over the network, an in-person transaction that comprises a physical transfer of physical value to the first party from the second party, wherein brokering the in-person transaction that comprises the physical transfer of the physical value from the first party to the second party comprises:

selecting, by the controller, a closest one of a plurality of preselected sites to the first party and the second party as a transaction location; and directing the first party and the second party to the transaction location via the first user device and the second user device; and in response to receiving confirmation of the physical transfer of the physical value between the first party and the second party, adjusting a first financial account associated with the first party and a second financial account associated with the second party to reflect the physical transfer in a digital transfer between the first financial account and the second financial account residing on one or more customer financial accounts databases.

2. The method of claim 1, wherein:

receiving the request from the first party comprises receiving a request for a particular amount of currency from the second party via the first user device; and wherein identifying the available one of the population of parties to be the second party is performed in response to determining that no automated teller machine is within a proximity threshold to a current location of the first user device.

3. The method of claim 1, wherein identifying the available one of the population of parties comprises:

determining respective current locations of the population of parties via respective user devices;

comparing the respective current locations of the population of parties to a location of the first party;

selecting a subset of the population of parties based on being closest to the location of the first party; and excluding any candidate of the subset of the population of parties that is not available to meet in-person.

4. The method of claim 1, wherein identifying the available one of the population of parties comprises:

determining an available population of parties reachable via respective user devices;

identifying a subset of the available population of parties capable of transferring the physical value based on information in respective financial accounts; and determining a willingness of particular ones of the subset based on a selected one of: (i) a pre-existing consent user setting and (ii) a solicited consent response.

5. The method of claim 1, wherein vouching for the financial trustworthiness of the second party to the first party via the first user device comprises:

receiving, by the controller, a biometric input from the second party via the second user device; and identifying the second party based on the biometric input.

6. The method of claim 1, wherein receiving the confirmation of the physical transfer of the physical value between the first party and the second party comprises:

receiving a digital image from the first user device;

recognizing a currency denomination and a currency bill serial number of currency in the image; and receiving an indication from the first party via the first user device of acceptance of the currency as the physical value.

7. A secure transaction system that facilitates secure in-person peer-to-peer transaction, the secure transaction system comprising:

a communication module;

a memory containing financial accounts for customers;

an authentication system; and a controller communicatively coupled to the communication module, the memory, and the authentication system, the controller enables the secure transaction system to:

monitor a population of parties that are candidates for participating in a transaction;

receive a request from a first party to identify a second party that is available to perform the transaction;

identifying an available one of the population of parties to be the second party;

optimize selection of the second party for the transaction based on identification and matching criteria, wherein the optimizing uses artificial intelligence to select the second party;

authenticate the first party via a first user device and the second party via a second user device;

determine a financial trustworthiness of at least the second party;

vouch for the financial trustworthiness of the second party to the first party via the first user device, wherein vouching for the financial trustworthiness of the second party to the first party via the first user device comprises:

communicating a one-time password from a mobile banking platform to the second party via the second user device in response to identifying the second party;

receiving, by the mobile banking platform, the one-time password via the first user device;

confirming, by the mobile banking platform, the one-time password to the first party via the first user device;

obtaining an image of the second party via the second user device; and transmitting the image of the second party over a network to the first user device;

broker an in-person transaction over a network that comprises a physical transfer of physical value to the first party from the second party, wherein brokering the in-person transaction that comprises the physical transfer of the physical value from the first party to the second party comprises:

selecting, by the controller, a closest one of a plurality of preselected sites to the first party and the second party as a transaction location, and directing the first party and the second party to the transaction location via the first user device and the second user device; and in response to receiving confirmation of the physical transfer of the physical value between the first party and the second party, adjust a first financial account associated with the first party and a second financial account associated with the second party to reflect the physical transfer in a digital transfer between the first financial account and the second financial account residing on one or more customer financial accounts databases.

8. The secure transaction system of claim 7, wherein the request received from the first party comprises a request for a particular amount of currency, and wherein the controller enables the secure transaction system to:
  identify the available one of the population of parties to be the second party in response to determining that no automated teller machine is within a proximity threshold to a current location of the first user device.

9. The secure transaction system of claim 7, wherein, in identifying the available one of the population, the controller enables the secure transaction system to:
  determine respective current locations of the population of parties via respective user devices;
  compare the respective current locations of the population of parties to a location of the first party;
  select a subset of the population of parties based on being closest to the location of the first party; and
  exclude any candidate of the subset of the population of parties that is not available to meet in-person.

10. The secure transaction system of claim 7, wherein, in identifying the available one of the population of parties, the controller enables the secure transaction system to:
  determine an available population of parties reachable via respective user devices;
  identify a subset of the available population of parties capable of transferring the physical value based on information in respective financial accounts; and
  determine a willingness of particular ones of the identified subset based on a selected one of: (i) a pre-existing consent user setting and (ii) a solicited consent response.

11. The secure transaction system of claim 7, wherein, in vouching for the financial trustworthiness of the second party to the first party via the first user device, the controller enables the secure transaction system to:
  receive, by the controller, a biometric input from the second party via the second user device; and
  identify the second party based on the biometric input.

12. The secure transaction system of claim 7, wherein, in receiving the confirmation of the physical transfer of the physical value between the first party and the second party, the controller enables the secure transaction system to:
  receive a digital image from the first user device;
  recognize a currency denomination and a currency bill serial number of currency in the image; and
  receive an indication from the first party via the first user device of acceptance of the currency as the physical value.

13. A non-transitory computer-readable storage medium comprising computer-executable instructions, which when executed via a processing unit on a computer performs acts, comprising:
  monitoring, by a controller, a population of parties that are candidates for participating in a transaction;
  receiving, by the controller, a request from a first party to identify a second party that is available to perform the transaction;
  identifying an available one of the population of parties to be the second party;
  optimizing selection of the second party for the transaction based on identification and matching criteria, wherein the optimizing uses artificial intelligence to select the second party;
  authenticating, by the controller of a secure transaction system, the first party via a first user device and the second party via a second user device;
  determining a financial trustworthiness of at least the second party;
  vouching for the financial trustworthiness of the second party to the first party via the first user device, wherein vouching for the financial trustworthiness of the second party to the first party via the first user device comprises:
    communicating a one-time password from a mobile banking platform to the second party via the second user device in response to identifying the second party,
    receiving, by the mobile banking platform, the one-time password via the first user device,
    confirming, by the mobile banking platform, the one-time password to the first party via the first user device,
    obtaining an image of the second party via the second user device, and
    transmitting the image of the second party over a network to the first user device;
  brokering an in-person transaction that comprises a physical transfer of physical value to the first party from the second party, wherein brokering the in-person transaction that comprises the physical transfer of the physical value from the first party to the second party comprises:
    selecting, by the controller, a closest one of a plurality of preselected sites to the first party and the second party as a transaction location; and
    directing the first party and the second party to the transaction location via the first user device and the second user device; and
  in response to receiving confirmation of the physical transfer of the physical value between the first party and the second party, adjusting a first financial account associated with the first party and second financial account associated with the second party to reflect the physical transfer.

14. The non-transitory computer-readable storage medium of claim 13, further comprising:
  receiving a digital image from the first user device;
  recognizing a currency denomination and a currency bill serial number of currency in the digital image; and
  receiving an indication from the first party via the first user device of acceptance of the currency as the physical value.

15. The non-transitory computer-readable storage medium of claim 14, further comprising:
  correlating the digital image against official currency standards.

16. The method of claim 6, further comprising:
  correlating the digital image against official currency standards.

17. The secure transaction system of claim 12, wherein the controller further enables the secure transaction system to:
  correlate the digital image against official currency standards.

* * * * *